US012040978B2

(12) United States Patent
Calder

(10) Patent No.: US 12,040,978 B2
(45) Date of Patent: Jul. 16, 2024

(54) ANYCAST ROUTING TECHNIQUE FOR A CONTENT DELIVERY NETWORK

(71) Applicant: MICROSOFT TECHNOLOGY LICENSING, LLC, Redmond, WA (US)

(72) Inventor: Matthew Calder, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 174 days.

(21) Appl. No.: 17/221,658

(22) Filed: Apr. 2, 2021

(65) Prior Publication Data

US 2022/0321479 A1    Oct. 6, 2022

(51) Int. Cl.
*H04L 47/125*    (2022.01)
*H04L 45/74*    (2022.01)

(52) U.S. Cl.
CPC ............ *H04L 47/125* (2013.01); *H04L 45/74* (2013.01)

(58) Field of Classification Search
CPC .............................. H04L 47/125; H04L 45/74
USPC ......................................................... 370/235
See application file for complete search history.

(56) References Cited

U.S. PATENT DOCUMENTS

| 7,330,906 | B2* | 2/2008 | Hameleers | H04L 12/185 |
| | | | | 709/245 |
| 7,453,842 | B2* | 11/2008 | Yamamoto | H04W 8/065 |
| | | | | 370/313 |
| 7,676,595 | B2* | 3/2010 | Ettikan | H04L 69/167 |
| | | | | 370/328 |
| 7,788,405 | B2* | 8/2010 | Ranganathan | H04L 41/0886 |
| | | | | 370/401 |
| 7,797,426 | B1* | 9/2010 | Lyon | H04L 67/1021 |
| | | | | 709/227 |

(Continued)

FOREIGN PATENT DOCUMENTS

| WO | WO-2014071094 A3 * | 6/2014 | .......... G06Q 20/145 |
| WO | WO-2015017816 A1 * | 2/2015 | .......... H04L 45/122 |
| WO | WO-2016007760 A2 * | 1/2016 | ............ H04L 45/48 |

OTHER PUBLICATIONS

Congestion Avoidance and Load Balancing in Content Placement and Request Redirection for Mobile CDN Jiayi Liu; Qinghai Yang; Gwendal Simon IEEE/ACM Transactions on Networking Year: 2018 | vol. 26, Issue: 2 | Journal Article | Publisher: IEEE (Year: 2018).*

(Continued)

*Primary Examiner* — Melvin H Pollack
(74) *Attorney, Agent, or Firm* — Newport IP, LLC; Jacob P. Rohwer

(57) ABSTRACT

The system disclosed herein implements an improved anycast routing technique that enables a content delivery network (CDN) to control the load on various points of presence (PoPs), but that also maintains the ability to have requests that would have been sent to an offline PoP be automatically redirected to another PoP. The CDN is able to control the load on the PoPs by configuring content requests to be routed to a particular PoP. For instance, a CDN is configured to assign a subnet of distinct IP addresses to each PoP in a group of PoPs, so that each PoP can announce a unique anycast prefix. The CDN can control when and how these unique anycast prefix are announced to balance load across the PoPs.

20 Claims, 6 Drawing Sheets

(56) References Cited

U.S. PATENT DOCUMENTS

| | | | |
|---|---|---|---|
| 7,864,765 B2* | 1/2011 | Borkenhagen | H04L 47/122 370/254 |
| 8,244,253 B2* | 8/2012 | Choi | H04W 36/0016 370/328 |
| 8,447,862 B2* | 5/2013 | Sakata | H04L 12/6418 709/225 |
| 8,621,042 B2* | 12/2013 | Eggleston | H04L 61/4511 370/254 |
| 8,745,177 B1* | 6/2014 | Kazerani | H04L 41/5067 709/224 |
| 8,886,830 B2* | 11/2014 | Kwapniewski | H04L 67/1004 709/238 |
| 8,923,314 B2* | 12/2014 | Satterlee | H04L 67/1001 370/401 |
| 9,591,053 B2* | 3/2017 | Willbanks | H04L 67/1029 |
| 10,033,605 B2* | 7/2018 | Santoro | H04L 67/1021 |
| 10,205,663 B1* | 2/2019 | Jones | H04L 45/745 |
| 10,432,710 B2* | 10/2019 | Maslak | H04L 67/63 |
| 10,455,030 B2* | 10/2019 | Maslak | H04L 67/1004 |
| 10,567,333 B2* | 2/2020 | Sawyer | H04L 47/122 |
| 10,742,593 B1* | 8/2020 | Vasquez | H04L 67/1097 |
| 11,277,328 B1* | 3/2022 | Sharma | H04L 45/02 |
| 11,283,757 B2* | 3/2022 | Schomp | H04L 45/74 |
| 11,394,635 B2* | 7/2022 | Mahadevan | H04L 61/5069 |
| 11,418,843 B2* | 8/2022 | Sun | H04N 21/47202 |
| 11,425,042 B2* | 8/2022 | Goel | H04L 69/326 |
| 11,451,477 B2* | 9/2022 | Goel | H04L 67/10 |
| 11,489,815 B2* | 11/2022 | Webb | H04L 63/1458 |
| 11,516,112 B2* | 11/2022 | Boutros | H04L 45/74 |
| 11,665,090 B1* | 5/2023 | Banerjee | H04L 45/745 709/238 |
| 11,677,717 B2* | 6/2023 | Wondra | H04L 63/0485 726/13 |
| 11,706,292 B1* | 7/2023 | Friedrich | H04L 67/1021 709/201 |
| 11,722,402 B2* | 8/2023 | Flores | H04L 45/745 370/216 |
| 11,754,997 B2* | 9/2023 | Engelstein | H04Q 9/02 700/291 |
| 11,799,950 B1* | 10/2023 | Banerjee | H04L 67/1012 |
| 11,895,227 B1* | 2/2024 | Chamorro | H04L 9/0825 |
| 11,902,383 B2* | 2/2024 | King, V | H04L 69/16 |
| 11,909,716 B1* | 2/2024 | Bhatia | H04L 61/5084 |
| 11,916,729 B2* | 2/2024 | Brocato | H04L 41/0806 |
| 11,916,869 B2* | 2/2024 | Zhu | H04L 61/4511 |
| 11,916,995 B1* | 2/2024 | Thomason | H04L 67/1038 |
| 2010/0235441 A1 | 9/2010 | Christian et al. | |
| 2014/0201371 A1* | 7/2014 | Gupta | H04L 67/1023 709/226 |
| 2014/0258523 A1* | 9/2014 | Kazerani | H04L 43/12 709/224 |
| 2017/0134274 A1* | 5/2017 | Araújo | H04L 45/74 |
| 2019/0132281 A1* | 5/2019 | Sawyer | H04L 47/122 |
| 2020/0169613 A1* | 5/2020 | King, V | H04L 69/16 |
| 2020/0267086 A1 | 8/2020 | Sawyer et al. | |
| 2022/0239629 A1* | 7/2022 | Wu | H04L 61/2592 |
| 2022/0295117 A1* | 9/2022 | Brocato | H04L 67/5682 |
| 2022/0345402 A1* | 10/2022 | Chen | H04L 45/745 |
| 2022/0377007 A1* | 11/2022 | Araújo | H04L 45/30 |
| 2023/0239234 A1* | 7/2023 | Zohar | H04L 45/123 370/389 |
| 2023/0261984 A1* | 8/2023 | Dunbar | H04L 45/74 370/328 |
| 2023/0269165 A1* | 8/2023 | Xie | H04L 45/16 370/389 |
| 2023/0269223 A1* | 8/2023 | Thubert | H04L 61/5007 709/245 |
| 2023/0336623 A1* | 10/2023 | Gourgaris | G06F 16/273 |
| 2023/0388218 A1* | 11/2023 | Erickson | H04L 45/04 |
| 2023/0412503 A1* | 12/2023 | Zhang | H04L 47/125 |
| 2024/0022538 A1* | 1/2024 | Iyer | H04L 12/4633 |
| 2024/0022598 A1* | 1/2024 | Iyer | H04L 61/2514 |
| 2024/0048525 A1* | 2/2024 | Ballew | H04L 61/4511 |

OTHER PUBLICATIONS

Converged fixed and mobile broadband networks based on next generation point of presence Stéphane Gosselin; Tahar Mamouni; Philippe Bertin; Jose Torrijos; Dirk Breuer; Erik Weis; Jean-Charles Point 2013 Future Network & Mobile Summit Year: 2013 | Conference Paper | Publisher: IEEE (Year: 2013).*

Load balancing in bounded-latency content distribution 26th IEEE International Real-Time Systems Symposium (RTSS'05) (pp. 12 pp. -61) Chengdu Huang • Gang Zhou • T.F. Abdelzaher • Sang Hyuk Son • J.A. Stankovic Publication Date: Jan. 1, 2005 ( Year: 2005).*

"International Search Report and Written Opinion Issued in PCT Application No. PCT/US22/020665", Mailed Date: Jul. 8, 2022, 11 Pages.

* cited by examiner

ANYCAST ROUTING TECHNIQUE FOR A CONTENT DELIVERY NETWORK

BACKGROUND

A content delivery network (CDN), which may also be referred to as a content distribution network, is a geographically distributed network of servers configured, for example, in different datacenters. With the growth of the Internet and the demand for network content, CDNs have expanded to deliver various types of content, including web objects (e.g., text, graphics, and scripts), downloadable objects (e.g., operating system updates, media files, software, documents, etc.), applications ("apps"), live streaming media, on-demand streaming media, social media data, and so forth.

Content owners, such as media companies and e-commerce vendors, often engage with an operator of a CDN to deliver their content to end-users, or end-user devices. One of the goals for an operator of a CDN is to provide high availability for content and optimal performance by spatially distributing the destination servers that provide the content relative to the end-user devices that are likely to request the content. Accordingly, an operator of a CDN strategically configures destination servers in different geographic locations so that the content can be provided in an effective and efficient manner to geographically dispersed end-user devices. In various examples, the owners of content stored and distributed via the CDN may be referred to as "customers" of the entity operating the CDN. In alternative example, an entity operating the CDN may also be an owner of content stored and distributed via the CDN. Accordingly, a content provider may be the entity operating the CDN or an entity that is a customer of the entity operating the CDN.

An operator of a CDN can implement different techniques to direct or route content requests to the CDN. One conventional technique used to direct or route content requests to the CDN is unicast. Using unicast, Domain Name System (DNS) records are maintained and can be used to provide an Internet Protocol (IP) address for an entry point (e.g., a server) into the CDN, in response to a DNS query that includes a name of a web site, for example. Operators of CDNs like unicast because unicast has a high level of control over load management via the use of DNS records. That is, unicast enables the content requests to be balanced across different entry points into the CDN. A consequence of this is that unicast does not prioritize sending a content request to an entry point that is closest to a geographic region where the content request originates, which is based on a location of an end-user device. For instance, unicast may route a content request received in San Francisco to an entry point near Chicago, rather than an entry point near San Francisco. Again, this unicast routing may be due to load balancing configurations and because Chicago may be the location where the destination server hosting the requested content (e.g., a web site) is configured.

However, unicast can cause some problems based on DNS time-to-life (TTL) expiration. In the event of an issue associated with an entry point, such as a failed server, a cached IP address is still used to try to access the CDN via the failed server for a period of time after the server fails. This period of time may last days or even up to a week, which has a negative effect on the user experience. That is, if an entry point server fails or is taken offline while the DNS records indicate that the cached IP address remains active, end-user devices will be unable to access the content for a period of time.

Another conventional technique used to direct or route content requests to the CDN is anycast. Anycast is popular amongst some operators of CDNs due to its operational simplicity and its ability to avoid the DNS TTL pitfalls discussed above. With respect to the operational simplicity aspect, there is no need for an operator of a CDN to create, maintain, and update large databases storing DNS records useable to make routing decisions and identify a load-balanced entry point into the CDN. Instead, using anycast, content requests are typically sent to a set of servers that is geographically located closest to the location where the content requests originate. This set of servers provides entry into the CDN and may be referred to as a point of presence ("PoP"). Accordingly, a CDN can configure various PoPs that are geographically dispersed with respect to one another (e.g., throughout the world, throughout a continent, throughout a country, etc.). Anycast uses routing techniques, such as Border Gateway Protocol (BGP), to exchange routing information amongst different autonomous systems, or the "networks" that comprise the Internet. Consequently, using anycast, the CDN is not responsible for mapping and determining paths between end-user devices and PoPs.

Anycast employs the use of prefix announcements to inform disparate networks (e.g., enterprise networks, Internet service provider (ISP) networks, cell carrier networks, etc.) operating in various geographic regions that content requests can be sent to a set of IP addresses. The set of IP addresses is common to all the PoPs. Accordingly, when a content request is received, BGP typically routes the content request to the geographically closest PoP for entry into the CDN. Because all the PoPs use a common set of IP addresses, a particular PoP can be taken offline due to an issue or maintenance, and the content requests that would have been sent to the offline PoP can automatically be redirected to another PoP with no problems. This anycast configuration helps avoid the DNS TTL pitfalls discussed above.

However, while anycast provides the benefits described above, the CDN loses control of load management with respect to the PoPs while using anycast. This is because an independent routing technique, such as BGP, decides where to send the content requests. Consequently, there is an increased possibility that a particular PoP becomes overloaded and/or fails because BGP is configured to route the content requests to the closest PoP. Furthermore, BGP is not well equipped to find the best path between an end-user device and any one of multiple PoPs. In this scenario, the best path may be based on performance factors that can negatively impact the user experience, such as latency, bandwidth, and server load. Therefore, the best performing path may not always be a path to the geographically closest PoP.

Accordingly, both unicast and anycast routing techniques have shortfalls when it comes to routing a content request to an entry point into a CDN. It is with respect to these and other considerations the disclosure made herein is presented.

SUMMARY

The system disclosed herein implements an improved anycast routing technique that enables a content delivery network (CDN) to control the load on various points of presence (PoPs), but that also maintains the ability to have requests that would have been sent to an offline PoP be automatically redirected to another PoP. The CDN is able to control the load on the PoPs by configuring content requests to be routed to a particular point of presence (PoP). The initial routing may be based on geography, such that a content request is routed to a PoP that is geographically closest to a geographic region in which the content request originates based on a location of an end-user device. However, to balance load and improve performance, the techniques described herein may route content requests to PoPs other than the one that is geographically closest to a location at which the content requests originate.

To implement this improved anycast routing technique, a CDN is configured to assign a subnet of distinct IP addresses to each PoP in a group of PoPs. For example, a first PoP in Los Angeles may be assigned to IP addresses in a subnet "40.90.64.1". A second PoP in Seattle may be assigned to IP addresses in a subnet "40.90.65.1". And a third PoP in San Francisco may be assigned to IP addresses in a subnet "40.90.66.1". As shown, the third octet in the assigned subnets is different, and thus, each of the subnets includes a distinct set of IP addresses in a different "/24", or a set of 256 possible IP addresses.

As described above, anycast uses prefix announcements to inform disparate networks (e.g., enterprise networks, Internet service provider (ISP) networks, cell carrier networks, etc.) operating in various geographic regions that content requests can enter the CDN via the announced set of IP addresses. Previously, each PoP in the group of PoPs announces the same set of IP addresses. However, in the improved anycast routing technique, each PoP is configured to announce a unique anycast prefix that identifies the respective subnet of IP addresses assigned to the PoP. Continuing the example set forth above, the first PoP in Los Angeles announces a unique anycast prefix of "40.90.64.0/24", the second PoP in Seattle announces a unique anycast prefix of "40.90.65.0/24", and the third PoP in San Francisco announces a unique anycast prefix of "40.90.66.0/24".

These unique prefix announcements are directed to networks in different geographic regions. Furthermore, an individual prefix announcement can be directed to one or multiple geographic regions. Accordingly, the CDN has a conceptual understanding of geography and can divide a broader area (e.g., the world, a continent, a country, etc.) into geographic regions so that the traffic load can be balanced across the group of PoPs. In one example, this division can be based on predefined boundaries such as countries, states, provinces, counties, cities, etc. In other examples, the boundaries for different regions can be defined by the CDN, such that they are rough boundaries established based on a network's service area.

Again, referring to the example above and for illustration purposes only, the CDN can instruct the first PoP in Los Angeles to announce its unique anycast prefix to networks operating in southern California and Arizona. Meanwhile, the CDN can instruct the second PoP in Seattle to announce its unique anycast prefix to networks operating in Washington, Oregon, and Idaho. The CDN can instruct the third PoP in San Francisco to announce its unique anycast prefix announcement to networks operating in northern California and Nevada. The use of these unique prefix announcements to different geographic regions enables the CDN to control the load on individual ones of the PoPs.

The CDN is further configured to instruct all the PoPs in the group to announce a common anycast prefix simultaneously with the unique anycast prefixes. The common anycast prefix identifies a set of IP addresses that covers all the possible IP addresses in the different subnets assigned to the PoPs, and therefore, the common anycast prefix may be referred to as a covering prefix. For instance, the common anycast prefix can specify "40.90.64.0/18", which covers all the possible IP addresses in the example subnets provided above—"40.90.64.0/24", "40.90.65.0/24", and "40.90.66.0/24". Consequently, the unique anycast prefixes (e.g., "/24") are more specific than the common anycast prefix (e.g., a "/18"), or alternatively stated, the unique anycast prefixes define smaller sets of possible IP addresses which are each included in a larger set of IP addresses specified via the covering prefix.

Because independent routing techniques such as Border Gateway Protocol (BGP) prefer more specific anycast prefixes when making decisions to route a content request to a PoP, these independent routing techniques first attempt to route a content request using an IP address in one of the subnets announced via the unique anycast prefixes (e.g., "40.90.64.0/24", "40.90.65.0/24", "40.90.66.0/24"). Consequently, the unique anycast prefixes are mechanisms used by a CDN to control where (e.g., a particular PoP) a content request from a particular geographic region is routed. This level of control can be dynamically configured by a CDN to manage load and improve performance of the PoPs.

To further illustrate, and again referring to the example provided above, if the first PoP in Los Angeles is not performing well (e.g., is overloaded, is experiencing elevated latencies due to a bad performing ISP, etc.), the CDN can instruct the first PoP in Los Angeles to withdraw its unique prefix announcement to the Arizona region but not to the southern California region, thereby easing the load on the servers in the first PoP. In some embodiments, and in conjunction with the withdrawal, the CDN can instruct the third PoP in San Francisco to announce its unique anycast prefix to the Arizona region, so that the traffic from the Arizona region is switched from being routed to the first PoP in Los Angeles to being routed to a better performing PoP in San Francisco. In alternative embodiments, and in conjunction with the withdrawal, the CDN can instruct the first PoP in Los Angeles to announce the unique anycast prefix for San Francisco to the Arizona region, again, so that the traffic from the Arizona region is switched from being routed to the first PoP in Los Angeles to being routed to the better performing PoP in San Francisco.

In addition to the benefit of being able to better control the load at individual PoPs, the improved anycast routing technique still provides a backup mechanism to ensure each content request is routed to any of the PoPs in the group. This backup mechanism is useful in scenarios where a particular PoP unexpectedly fails or is taken offline for various reasons (e.g., server maintenance). If one of these scenarios occur, the PoP can withdraw the announcements of the unique anycast prefix and the common anycast prefix, and content requests that would have been sent to the failed or offline PoP are still automatically redirected to another PoP by way of the less specific common anycast prefix. This is because the common anycast prefix covers all the different unique sets of IP addresses announced by the different PoPs.

The techniques disclosed herein provide a number of features that improve existing computing devices, such as servers and network routing equipment. For instance, servers operating within PoPs are less likely to become overloaded, thereby ensuring that CDN routing operations run more smoothly (e.g., computing resources such as processor cycles, memory, network bandwidth are saved) and the user experience with respect to content delivery is greatly improved. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The system disclosed herein implements an improved anycast routing technique that enables a content delivery network (CDN) to control the load on various points of presence (PoPs), but that also maintains the ability to have requests that would have been sent to an offline PoP be automatically redirected to another PoP. The CDN is able to control the load on the PoPs by configuring content requests to be routed to a particular point of presence (PoP). The initial routing may be based on geography, such that a content request is routed to a PoP that is geographically closest to a geographic region in which the content request originates based on a location of an end-user device. However, to balance load and improve performance, the techniques described herein may route content requests to PoPs other than the one that is geographically closest to a location at which the content requests originate.

Figure 1:
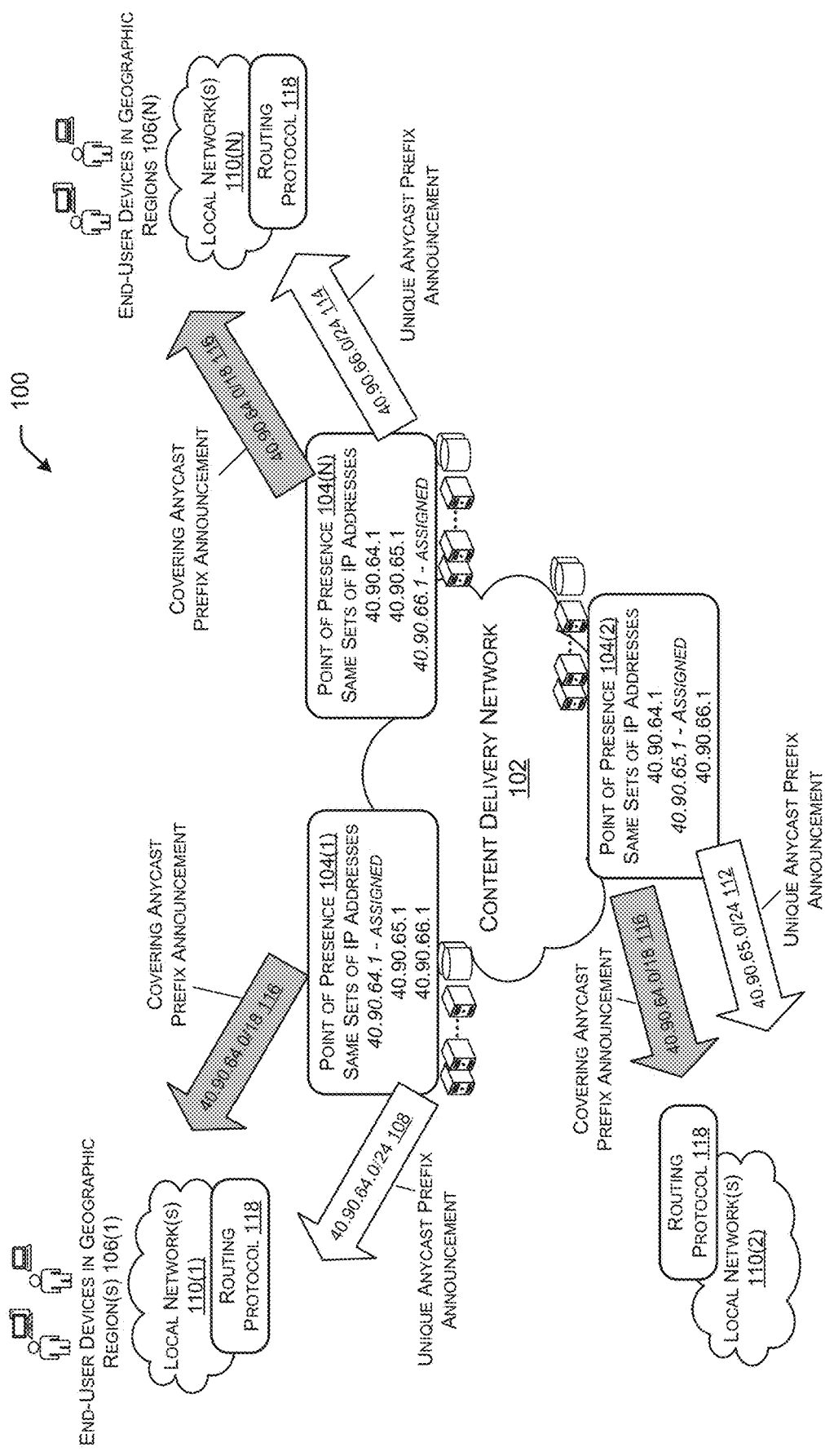
FIG. 1 illustrates an example scenario in which a content delivery network (CDN) implements an improved anycast routing technique that enables the CDN to control the load on various points of presence (PoPs).

FIG. 1 illustrates an example scenario 100 in which a CDN 102 implements an improved anycast routing technique that enables the CDN 102 to control the load on various PoPs 104(1-N). The various PoPs 104(1-N) are strategically configured by an operator of the CDN 102 in different locations to provide entry into the CDN 102. Each PoP 104(1-N) includes a set of servers and other resources used to receive content requests and pass the content requests to other resources in the CDN 102. For illustrative purposes and the examples discussed herein, "N" is equal to three. However, "N" can be any positive integer number that reflects the number of PoPs configured by the operator of the CDN 102 (e.g., "N" can be two, four, five, ten, twenty, etc.).

As described herein, PoP 104(1) can be configured to receive content requests from end-user devices in geographic region(s) 106(1), PoP 104(2) can be configured to receive content requests from end-user devices in geographic region(s) 106(2), and PoP 104(N) can be configured to receive content requests from end-user devices in geographic regions 106(N). To have a stronger element of load control with respect to the routing of the content requests to the PoPs 104(1-N), the CDN 102 allocates the same sets of IP addresses in different subnets (e.g., "/24") to all the PoPs 104(1-N). As listed in FIG. 1, each of the PoPs 104(1-N) is informed of "40.90.64.1", "40.90.65.1", and "40.90.66.1". Based on this allocation, each of the PoPs 104(1-N) can internally announce, to the CDN 102 backbone, these sets of IP addresses (e.g., internally announce the "/32" or "40.90.64.1/32", "40.90.65.1/32", and "40.90.66.1/32") so they are known to be anycast IP addresses.

The CDN 102 is further configured to assign a subnet of distinct IP addresses to each PoP in the group of PoPs 104(1-N). As illustrated, PoP 104(1) (e.g., located in Los Angeles) may be assigned to IP addresses in a subnet "40.90.64.1". PoP 104(2) (e.g., located in Seattle) may be assigned to IP addresses in a subnet "40.90.65.1". PoP 104(N) (e.g., located in San Francisco) may be assigned to IP addresses in a subnet "40.90.66.1". As shown, the third octet in the assigned subnets is different, and thus, each of the subnets includes a distinct set of IP addresses in a different "/24", or a set of 256 possible IP addresses.

As described above, anycast uses prefix announcements to inform disparate networks (e.g., enterprise networks, Internet service provider (ISP) networks, cell carrier networks, etc.) operating in various geographic regions that content requests can enter the CDN 102 via an announced set of IP addresses. Previously, each PoP in the group of PoPs announces the same set of IP addresses. However, the CDN 102 in FIG. 1 instructs PoPs 104(1-N) to announce a unique anycast prefix that identifies the respective subnet of IP addresses assigned to the PoP.

Continuing the example set forth above, the first PoP 104(1) in Los Angeles announces a unique anycast prefix of "40.90.64.0/24" 108. This announcement is made to the local networks 110(1) that serve the geographic regions 106(1) (e.g., Southern California and Arizona). Similarly, the second PoP 104(2) in Seattle announces a unique anycast prefix of "40.90.65.0/24" 112 to local networks 110(2) that serve geographic regions 106(2) (e.g., Washington, Oregon, and Idaho). Finally, the third PoP 104(N) in San Francisco announces a unique anycast prefix of "40.90.66.0/24" 114 to local networks 110(N) that serve the geographic regions 106(N) (e.g., Northern California and Nevada).

Consequently, the unique anycast prefix announcements 108, 112, 114 are directed to networks in different geographic regions. Furthermore, an individual unique anycast prefix announcement can be directed to one or multiple geographic regions. Accordingly, the CDN 102 has a conceptual understanding of geography and can divide a broader area (e.g., the world, a continent, a country, etc.) into geographic regions so that the traffic load can be divided and balanced across the group of PoPs 104(1-N) using the unique anycast prefix announcements 108, 112, 114. In one example, this division can be based on predefined boundaries such as countries, states, provinces, counties, cities, neighborhoods, etc. In other examples, the boundaries for different regions can be defined by the CDN, such that they are rough boundaries established based on a network's service area.

The CDN 102 is further configured to instruct all the PoPs 104(1-N) to announce a common anycast prefix 116 simultaneously with the unique anycast prefixes 108, 112, 114. The common anycast prefix 116 identifies a set of IP addresses that covers all the possible IP addresses in the different subnets assigned to the PoPs 104(1-N), and therefore, the common anycast prefix 116 may be referred to as a covering prefix. For instance, the common anycast prefix 116 can specify "40.90.64.0/18", which covers all the possible IP addresses in the example subnets provided above— "40.90.64.0/24" 108, "40.90.65.0/24" 112, and "40.90.66.0/24" 114. Consequently, the unique anycast prefixes 108, 112, 114 (e.g., "/24") are more specific than the common anycast prefix 116 (e.g., a "/18"), or alternatively stated, the unique anycast prefixes 108, 112, 114 define smaller sets of possible IP addresses which are each included in a larger set of IP addresses specified via the covering prefix. Consequently, a unique anycast prefix is used to route a content request before the common anycast prefix is used to route the content request.

Because independent routing protocols 118, such as Border Gateway Protocol (BGP), prefer more specific anycast prefixes when making decisions to route a content request to a PoP, these independent routing protocols 118 first attempt to route a content request using an IP address in one of the subnets announced via the unique anycast prefixes (e.g., "40.90.64.0/24", "40.90.65.0/24", "40.90.66.0/24"). Consequently, the unique anycast prefixes are mechanisms used by the CDN 102 to control where (e.g., a particular PoP) a content request from a particular geographic region is routed. This level of control can be dynamically configured by the CDN 102 to manage load and improve performance of the PoPs.

Figure 2:
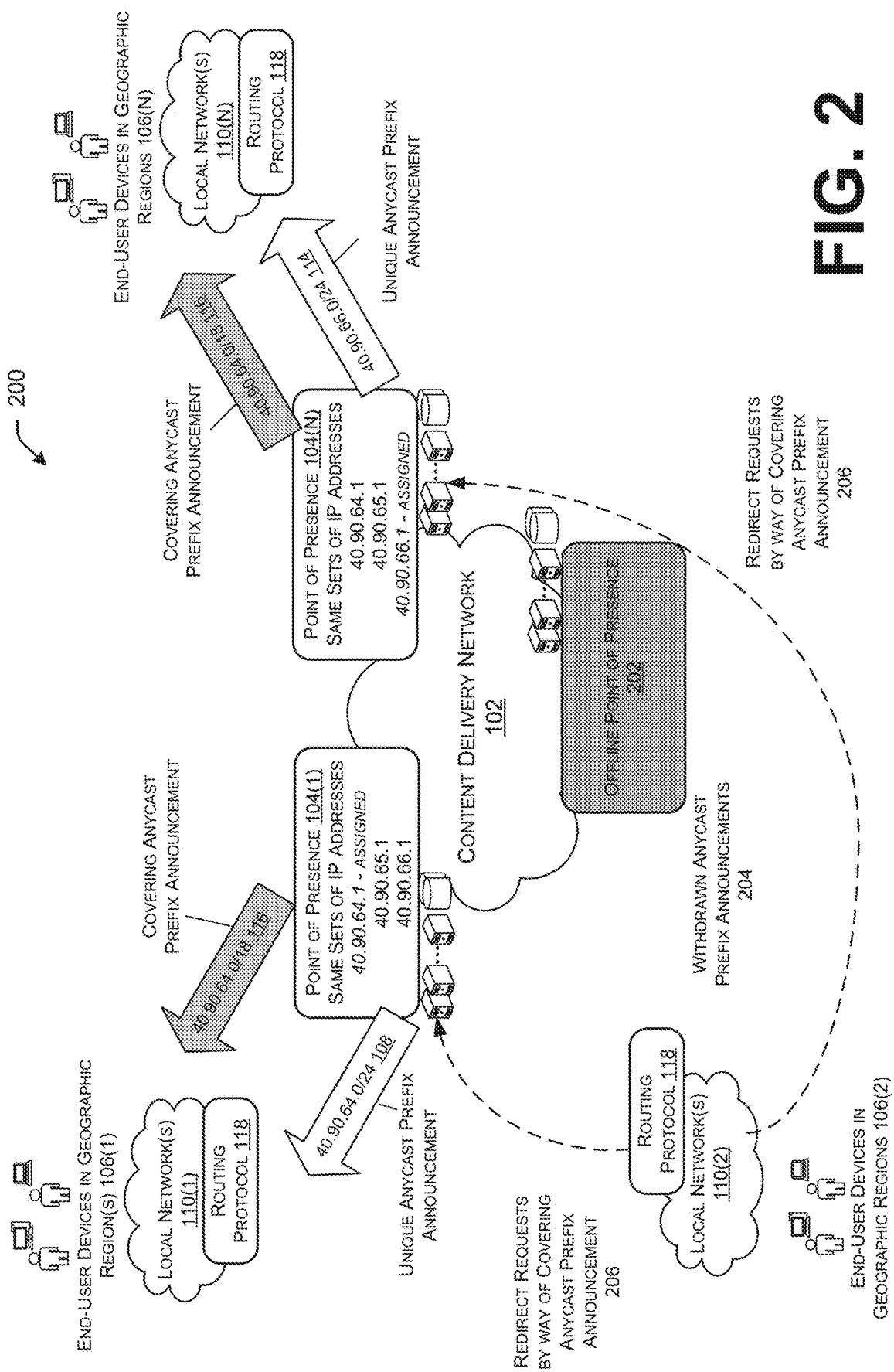
FIG. 2 illustrates an example scenario in which the CDN is able to maintain the ability to have content requests that would have been sent to an offline PoP be automatically redirected to another PoP.

FIG. 2 illustrates an example scenario 200 in which the CDN 102 is able to maintain the ability to have content requests that would have been sent to an offline PoP be automatically redirected to another PoP. As shown in FIG. 2, PoP 104(2) from FIG. 1 is now an offline PoP 202. This may be the result of some sort of issue, such as server failures. Alternatively, this may be because some sort of maintenance needs to be performed. Accordingly, offline PoP 202 withdraws its anycast prefix announcements 204 that were illustrated in FIG. 1. More importantly, the geographic regions 106(2) previously served by the offline PoP 202 do not have the same entry point into the CDN 102.

Rather, the common anycast prefix 116 serves as a backup mechanism to ensure each content request from the end-user devices in geographic regions 106(2) is routed to any of the other PoPs 104(1) or 104(N) while the PoP 104(2) is an offline PoP 202. That is, the routing protocol 118 uses the previously announced common anycast prefix 116 to redirect content requests 206 from geographic regions 106(2) to PoP 104(1) or PoP 104(N). This can be implemented because the common anycast prefix 116 covers all the different unique sets of IP addresses announced by the different PoPs 104(1-N). Moreover, Domain Name System (DNS) records are configured to cache the IP addresses in the common anycast prefix 116, so that they can be used after the PoP 202 goes offline.

Figure 3A:
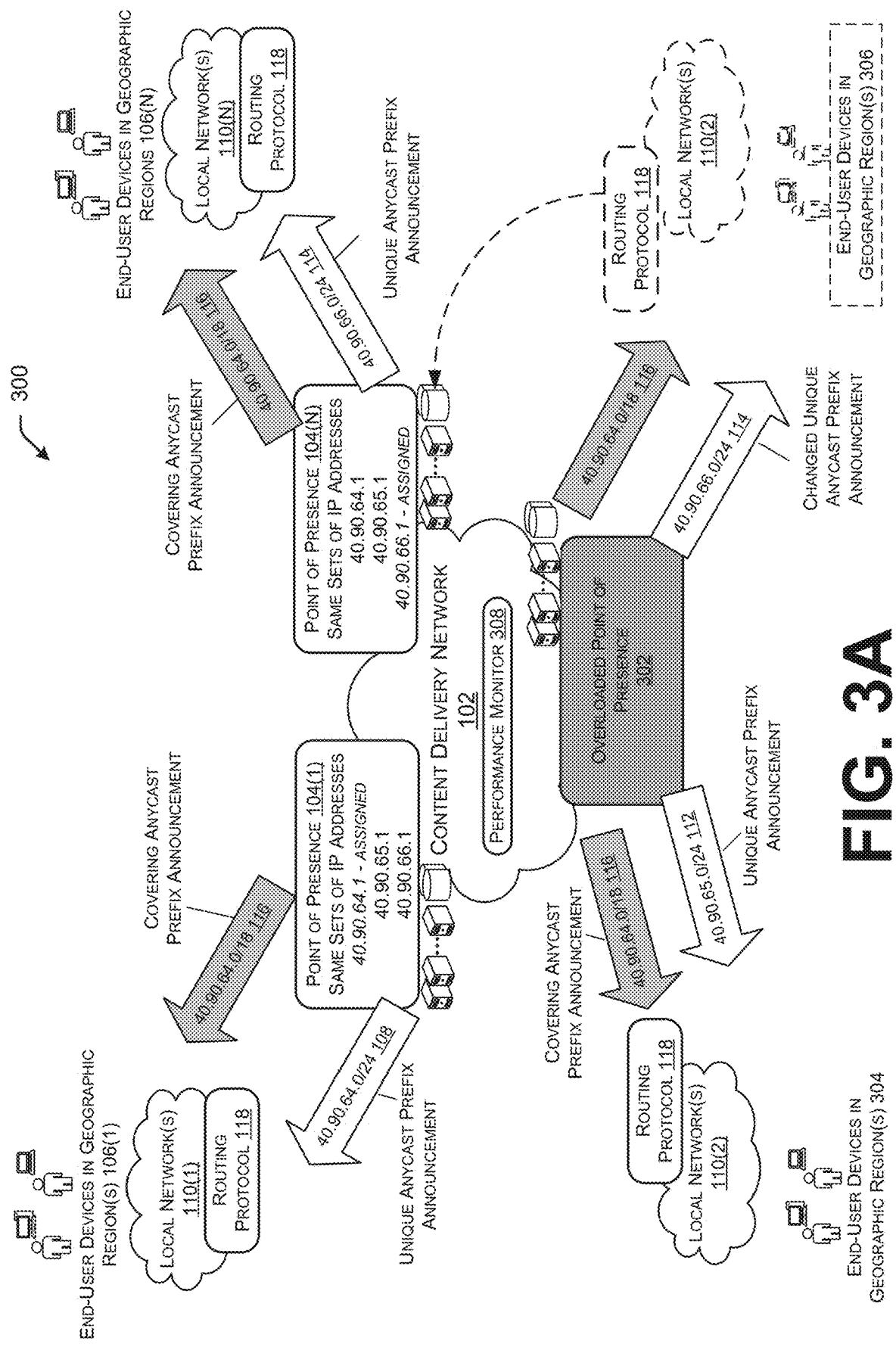
FIG. 3A illustrates an example scenario in which the CDN is able to control the load on various points of presence by changing a unique anycast announcement sent to a particular geographic region.

FIG. 3A illustrates an example scenario 300 in which the CDN 102 is able to control the load on various PoPs by changing a unique anycast announcement sent to a particular geographic region. As shown in FIG. 3A, PoP 104(2) from FIG. 1 is now an overloaded PoP 302. Accordingly, the geographic regions 106(2) previously served by the PoP 104(2) in FIG. 1 are separated out into geographic region(s) 304 (e.g., Washington and Oregon) and geographic region(s) 306 (e.g., Idaho). To ease the load on the overloaded PoP 302, the CDN 102 may decide to shed the content requests from geographic region(s) 306 so that they are sent to a different PoP.

Accordingly, the overloaded PoP 302 may withdraw its previous announcements to geographic region(s) 306 and change or switch the unique anycast prefix announcement for geographic region(s) 306 to a new one. That is, the overloaded PoP 302 can announce the unique anycast prefix "40.90.66.0/24" 114, which is assigned to the PoP 104(N) in San Francisco, to the local network(s) 110(2) that serve geographic regions 306. In this way, content requests that originate in geographic region(s) 306 are now directed to PoP 104(N) rather than the overloaded PoP 302. However, the announcements by the overloaded PoP 302 for geographic region(s) 304 remain unchanged compared to the scenario 100 in FIG. 1.

In various examples, the CDN can include a performance monitor 308 to analyze traffic and determine when a PoP (e.g., PoP 302) may be experience performance issues. While FIG. 3A illustrates a performance issue due to overload, other performance issues may provide valid reasons to redirect content requests to another PoP. For example, one PoP may be experiencing elevated latencies due to a bad performing ISP network. Accordingly, the CDN 102 can have traffic redirected amongst PoPs due to reasons it has no control over (i.e., the CDN cannot control the performance of the ISP network).

The performance monitor 308 is configured to analyze traffic routed to the CDN 102 over a period of time and identify (e.g., learn) traffic patterns that have a substantial effect on PoP performance and/or the end-user experience. In one example, the effect on traffic is substantial if it causes load concerns for an individual PoP, such that performance of the individual PoP may be negatively affected. Accordingly, the performance monitor 308 can be configured to learn and use performance level thresholds for PoPs. Based on an analysis of measurable performance factors such as latency and bandwidth, the performance monitor 308 can determine when a current performance level exceeds a performance level threshold. The CDN 102 can then take action to balance the load, as described herein. Again, the performance can be measured with respect to a PoP and/or routing paths between end-user devices and the PoP, even when these paths include segments operated by other networks (e.g., an ISP network).

Figure 3B:
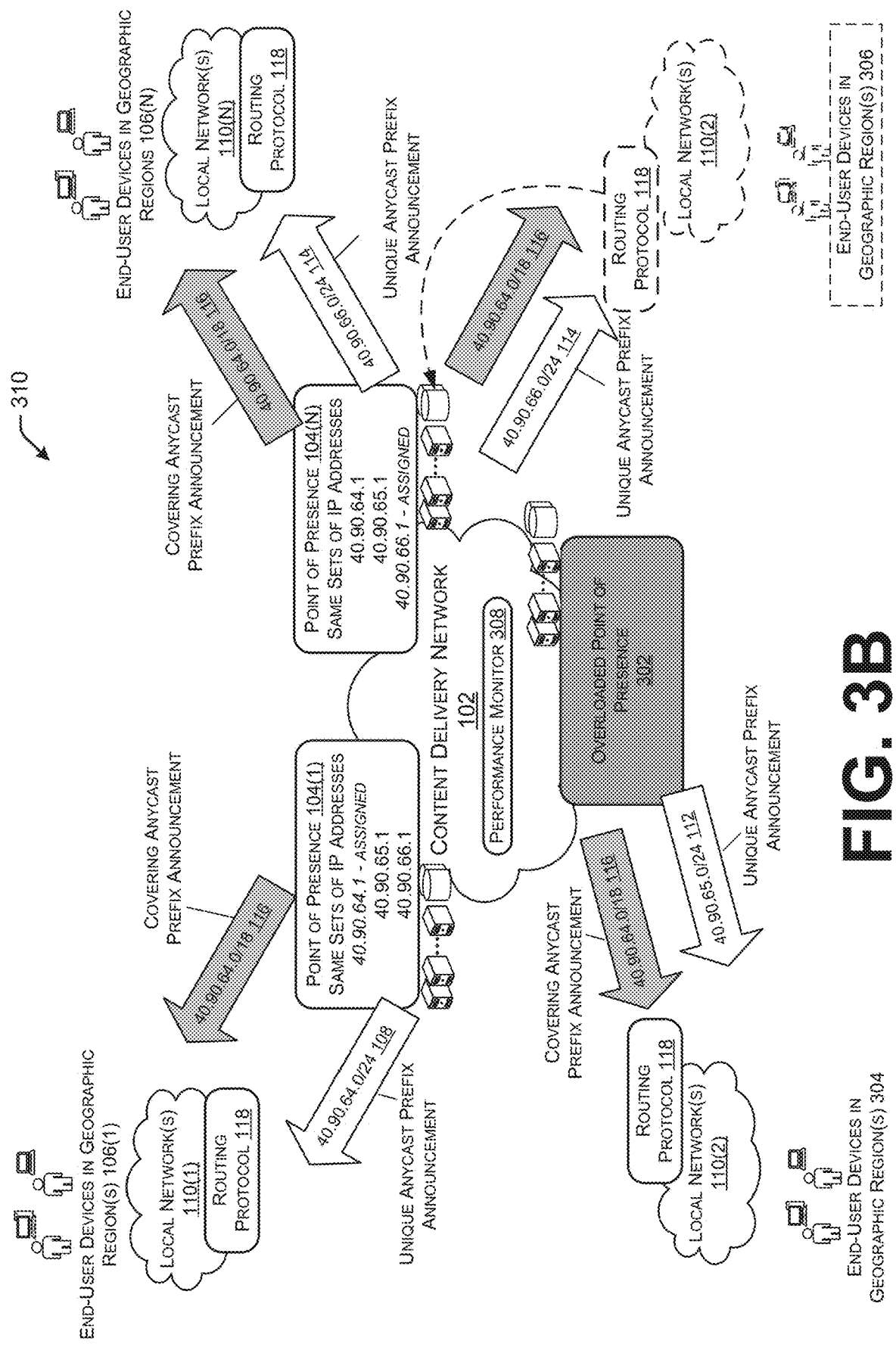
FIG. 3B illustrates another example scenario in which the CDN is able to control the load on various points of presence by changing a unique anycast announcement sent to a particular geographic region.

FIG. 3B illustrates another example scenario 310 in which the CDN is able to control the load on various points of presence by changing a unique anycast announcement sent to a particular geographic region. The example scenario 310 is similar to the example scenario 300 of FIG. 3A, except that in conjunction with the withdrawal of the unique anycast prefix announcement by the overloaded PoP 302 to geographic region(s) 306 (e.g., to ease load), the CDN 102 can instruct the PoP 104(N) in San Francisco to announce its unique anycast prefix 114 to geographic region(s) 306, so that the traffic from geographic region(s) 306 is changed or switched from being routed to the overloaded PoP 302 to being routed to the better performing PoP 104(N) in San Francisco. Stated alternatively, geographic region(s) 306 are essentially grouped with geographic region(s) 106(N) in the context of the example scenario 310 of FIG. 3B.

In various examples, the change illustrated in FIGS. 3A and/or 3B can be implemented at a predefined time-of-theday, time-of-the-week, time-of-the-month, and/or time-of-the-year. That is, the performance monitor 308 can detect and identify traffic patterns that cause performance issues for a particular PoP. These traffic patterns may reflect periodic times at which a traffic spike starts and ends. The times may be specific to a particular time zone that encompasses geographic regions served by the PoP. Accordingly, the techniques described herein can be used to ease load on a PoP in a particular time zone for a defined period of time, by redirecting some content requests to another PoP in another time zone, for example.

Figure 4:
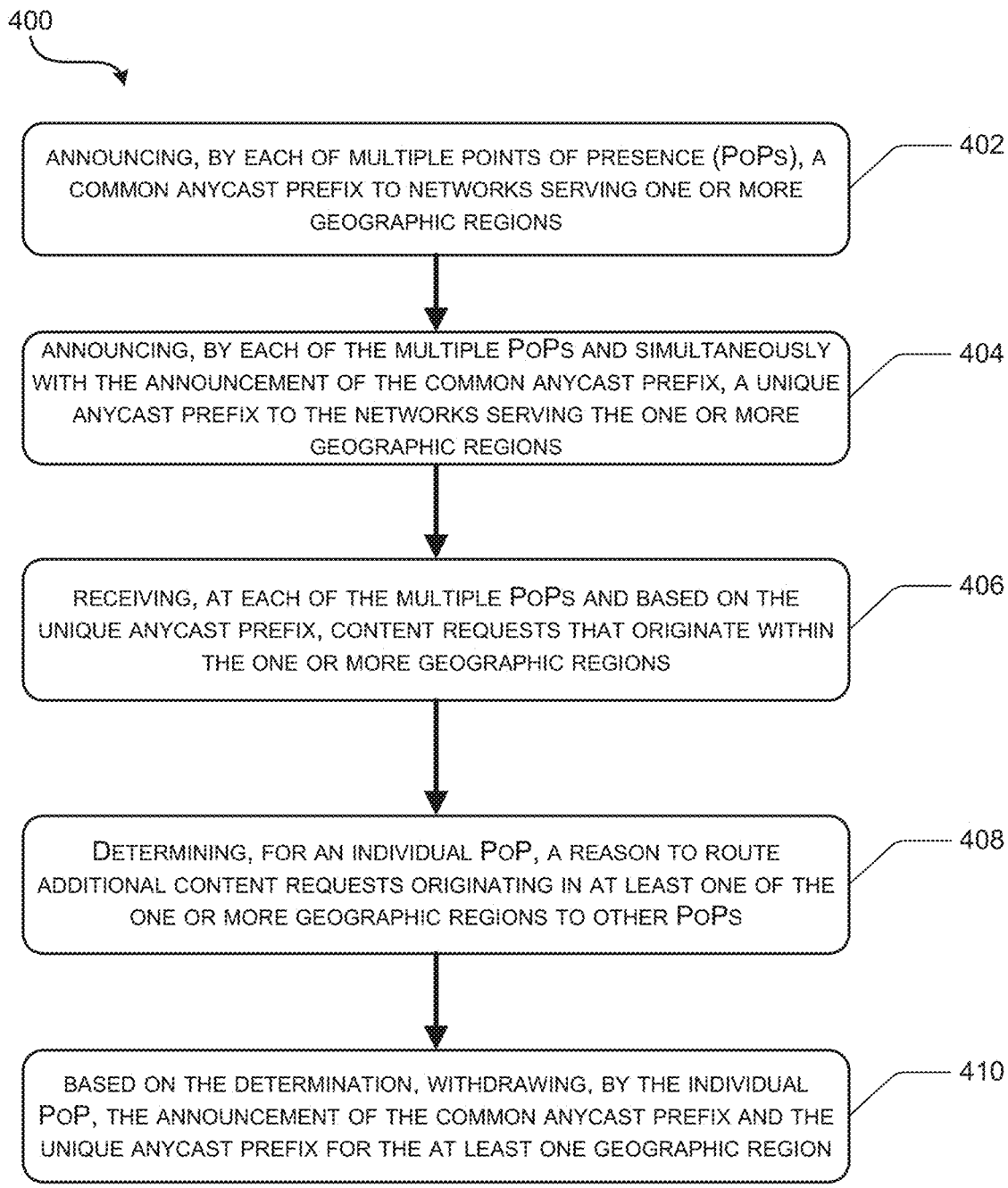
FIG. 4 is a flow diagram illustrating aspects of a sample routine that allows for a CDN to control the load on various PoPs.

FIG. 4 is a flow diagram illustrating a routine describing aspects of the present disclosure. In various examples, operations of the routine can be performed by a CDN. The logical operations described herein with regards to FIG. 4 can be implemented (1) as a sequence of computer implemented acts or program modules running on a computing device and/or (2) as interconnected machine logic circuits or circuit modules within a computing device.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 4, the routine 400 begins at operation 402 where each of multiple points of presence (PoPs) associated with a CDN is configured to announce a common anycast prefix to networks serving one or more geographic regions. At operation 404, each of the multiple PoPs is configured to simultaneously announce a unique anycast prefix to the networks serving the one or more geographic regions. As described above, the unique anycast prefix is more specific than the common anycast prefix so that an independent routing protocol, such as BGP, prioritizes the use of IP addresses specified by the unique anycast prefix.

At operation 406, each of the multiple PoPs receives content requests that originate within the one or more geographic regions served based on the BGP prioritizing the use of IP addresses specified by the unique anycast prefix compared to the IP addresses specified by the common anycast prefix. At operation 408, the CDN can determine a reason to route, for an individual PoP, additional content requests originating in at least one of the one or more geographic regions served by the individual PoP to other PoPs. As described above, this reason may be that the individual PoP has failed or encountered some other issue and needs to be taken offline. This reason can be scheduled maintenance. This reason can be a performance issue for which the load being handled by the individual PoP needs to be reduced.

At operation 410, the individual PoP withdraws the announcement of the common anycast prefix and the unique anycast prefix for the at least one geographic region. In this way, the content requests that originate in this geographic region after the withdrawal can be automatically rerouted to other PoPs via the previously announced common anycast prefix. Alternatively, the content requests that originate in this geographic region after the withdrawal can be rerouted to other PoPs via a changed announcement that specifies another unique anycast prefix for a different PoP.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 5:
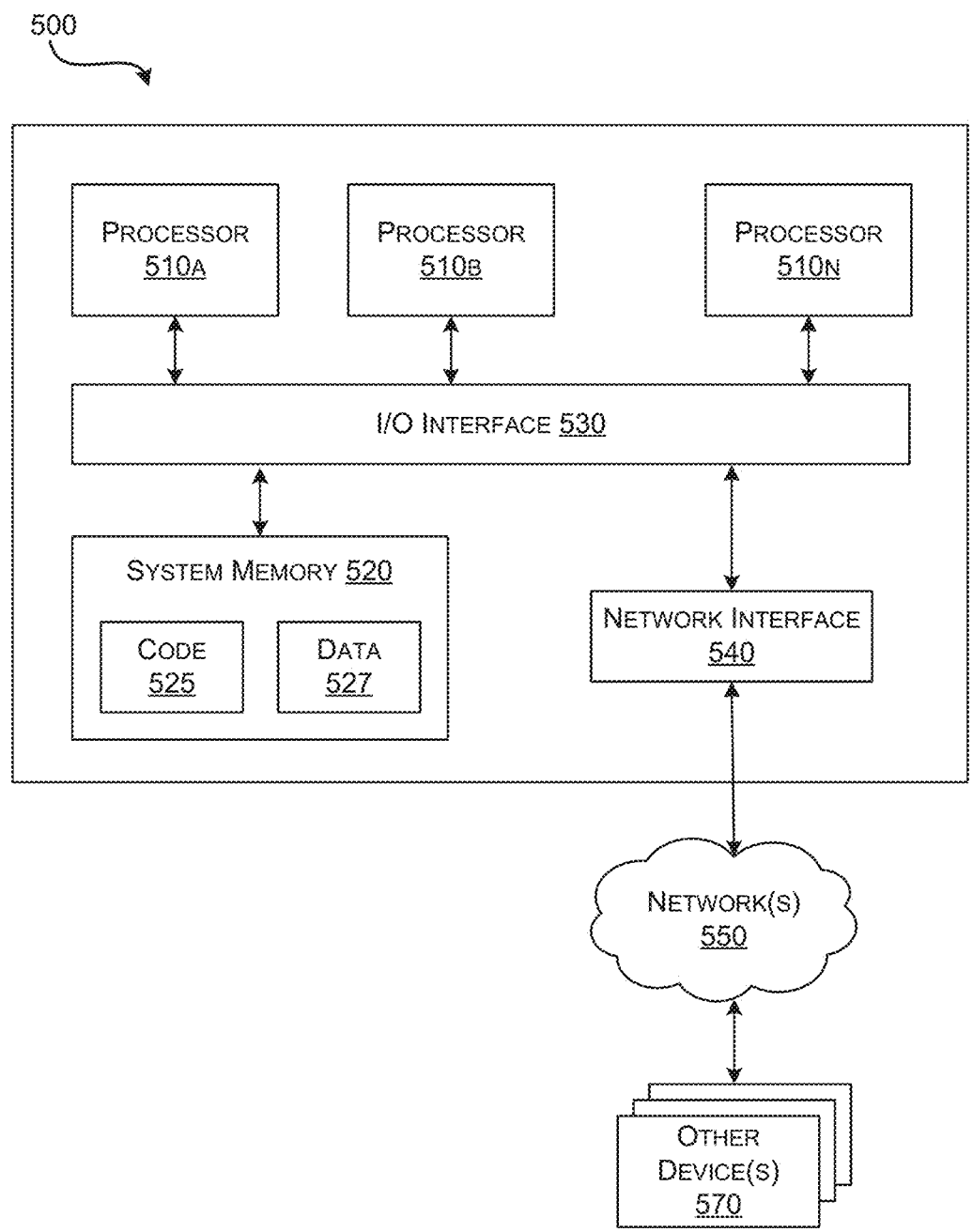
FIG. 5 is an example computing system capable of implementing the techniques of the present disclosure.

FIG. 5 illustrates a general-purpose computing device 500. In the illustrated embodiment, computing device 500 includes one or more processors 510*a*, 510*b*, and/or 510*n* (which may be referred herein singularly as "a processor 510" or in the plural as "the processors 510") coupled to a system memory 520 via an input/output (I/O) interface 530.

Computing device 500 further includes a network interface 540 coupled to the I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x77, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 710. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 520 as code 525 and data 527.

In one embodiment, the I/O interface 530 may be configured to coordinate I/O traffic between the processor 510, system memory 520, and any peripheral devices in the device, including network interface 540 or other peripheral interfaces. In some embodiments, the I/O interface 530 may perform any necessary protocol, timing, or other data transformations to convert data signals from one component (e.g., system memory 520) into a format suitable for use by another component (e.g., processor 510). In some embodiments, the I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of the I/O interface 530, such as an interface to system memory 520, may be incorporated directly into processor 510.

Network interface 540 may be configured to allow data to be exchanged between computing device 500 and other device or devices 570 attached to a network or network(s) 550, such as other computer systems or components illustrated in FIGS. 1 through 3B, for example. In various embodiments, network interface 540 may support communication via any suitable wired or wireless general data networks. Additionally, network interface 540 may support communication via telecommunications/telephony networks such as analog voice networks or digital fiber communications networks, via storage area networks such as Fibre Channel SANs or via any other suitable type of network and/or protocol.

Network(s) 550 may include, for example, public networks such as the Internet, private networks such as an institutional and/or personal intranet, or some combination of private and public networks. Network(s) 550 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 550 may utilize communications protocols, including packet-based and/or datagram-based protocols such as Internet protocol ("IP"), transmission control protocol ("TCP"), user datagram protocol ("UDP"), or other types of protocols. Moreover, network(s) 550 may also include a number of devices that facilitate network communications and/or form a hardware basis for the networks, such as switches, routers, gateways, access points, firewalls, base stations, repeaters, backbone devices, and the like.

In some embodiments, system memory 520 may be one embodiment of a computer-accessible medium configured to store program instructions and data as described above for FIGS. 1-4. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540.

Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/ or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 5, may include other components that are not explicitly shown in FIG. 5, or may utilize an architecture completely different than that shown in FIG. 5.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses.

Example Clause A, a method for balancing load across multiple points of presence associated with a content delivery network while also allowing for automatic redirection in case of an offline point of presence, the method comprising: announcing, by a point of presence associated with the content delivery network, a common anycast prefix useable to route content requests to any one of the multiple points of presence, wherein the point of presence announces the common anycast prefix to networks serving one or more geographic regions; announcing, by the point of presence and simultaneously with the announcement of the common anycast prefix, a unique anycast prefix useable to route the content requests to the point of presence, wherein the point of presence announces the unique anycast prefix to the networks serving the one or more geographic regions, and wherein the unique anycast prefix is more specific than the common anycast prefix such that the unique anycast prefix is used to route the content requests before the common anycast prefix is used to route the content requests; receiving, at the point of presence and based on the unique anycast prefix, first content requests that originate within the one or more geographic regions; determining that the point of presence is to be taken offline; and withdrawing, by the point of presence, the announcements of the common anycast prefix and the unique anycast prefix thereby causing at least some additional content requests that originate in the one or more geographic regions after the withdrawal to be automatically redirected to another point of presence based on the common anycast prefix previously announced by the point of presence.

Example Clause B, the method of Example Clause A, wherein: the unique anycast prefix includes a first set of Internet Protocol (IP) addresses; and the common anycast prefix includes a second set of IP addresses that covers the first set of IP addresses.

Example Clause C, the method of Example Clause A or Example Clause B, wherein the common anycast prefix is used as backup routing information to automatically redirect the additional content requests.

Example Clause D, the method of any one of Example Clauses A through C, wherein the networks include at least one of an Internet Service Provider network, a cellular carrier network, or an enterprise network.

Example Clause E, the method of any one of Example Clauses A through D, wherein border gateway protocol is used to: route the content requests to the point of presence; and automatically redirect the additional content requests to the other point of presence.

Example Clause F, the method of any one of Example Clauses A through E, wherein the point of presence is to be taken offline to resolve an issue or to perform maintenance.

Example Clause G, the method of any one of Example Clauses A through F, wherein the unique anycast prefix is used to manage load at the point of presence.

Example Clause H, a system comprising: one or more processors; and a computer-readable storage medium having computer-executable instructions stored thereupon which, when executed by the one or more processors, cause the system to perform operations comprising: announcing, by a point of presence associated with a content delivery network, a common anycast prefix, wherein the point of presence announces the common anycast prefix to networks serving one or more geographic regions; announcing, by the point of presence and simultaneously with the announcement of the common anycast prefix, a unique anycast prefix to the networks serving the one or more geographic regions; receiving, at the point of presence and based on the unique anycast prefix, content requests that originate within the one or more geographic regions; determining a reason to route additional content requests originating in at least one of the one or more geographic regions to other points of presence associated with the content delivery network; and based on the determination, changing, by the point of presence, the announcement of the unique anycast prefix for the at least one geographic region to an announcement of another unique anycast prefix that identifies another point of presence, associated with the content delivery network, to which the additional content requests can be routed.

Example Clause I, the system of Example Clause H, wherein the reason comprises one or more overloaded servers or a potential for one or more overloaded servers.

Example Clause J, the system of Example Clause H or Example Clause I, wherein: the unique anycast prefix includes a first set of Internet Protocol (IP) addresses; the other unique anycast prefix includes a second set of IP addresses that is different than the first set of IP addresses; and the common anycast prefix includes a third set of IP addresses that covers both the first set of IP addresses and the second set of IP addresses.

Example Clause K, the system of any one of Example Clauses H through J, wherein the change is implemented at a predetermined time of day.

Example Clause L, the system of Example Clause H, wherein the reason comprises a performance level for routing the content requests to the point of presence being below a threshold performance level based on an analysis of measurable factors including latency and bandwidth.

Example Clause M, the system of any one of Example Clauses H through L, wherein the networks include at least one of an Internet Service Provider network, a cellular carrier network, or an enterprise network.

Example Clause N, a system comprising: a first set of servers, associated with a content delivery network, configured to simultaneously announce a common anycast prefix and a first unique anycast prefix to first networks serving one or more first geographic regions, wherein a routing protocol routes first content requests that originate in the one or more first geographic regions to the first set of servers using the first unique anycast prefix; and a second set of servers, associated with the content delivery network, configured to simultaneously announce the common anycast prefix and a second unique anycast prefix to second networks serving one or more second geographic regions, wherein the routing protocol: routes second content requests that originate in the one or more second geographic regions to the second set of servers using the second unique anycast prefix when the second set of servers are online; or routes the second content requests that originate in the one or more second geographic regions to the first set of servers using the common anycast prefix when the second set of servers is offline.

Example Clause O, the system of Example Clause N, wherein: the first unique anycast prefix includes a first set of Internet Protocol (IP) addresses; the second unique anycast prefix includes a second set of IP addresses that is different than the first set of IP addresses; and the common anycast prefix includes a third set of IP addresses that covers the first set of IP addresses and the second set of IP addresses.

Example Clause P, the system of Example Clause N or Example Clause O, wherein the first networks and the second networks include at least one of an Internet Service Provider network, a cellular carrier network, or an enterprise network.

Example Clause Q, the system of any one of Example Clauses N through P, wherein the routing protocol comprises border gateway protocol.

Example Clause R, the system of any one of Example Clauses N through Q, wherein the first unique anycast prefix and the second unique anycast prefix are used to manage load across the first set of servers and the second set of servers.

Example Clause S, the system of any one of Example Clauses N through R, wherein the second set of servers is offline to resolve an issue or to perform maintenance.

Example Clause T, the system of any one of Example Clauses N through S, wherein the common anycast prefix is used as backup routing information to automatically redirect content requests to any one of multiple points of presence associated with the content delivery network.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different PoPs, two different geographic regions, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
one or more processors; and
a computer-readable storage medium having computer-executable instructions stored thereupon which, when executed by the one or more processors, cause the system to perform operations comprising:
announcing, by a point of presence associated with a content delivery network, a common anycast prefix, wherein the point of presence announces the common anycast prefix to networks serving one or more geographic regions;
announcing, by the point of presence and simultaneously with the announcement of the common anycast prefix, a unique anycast prefix to the networks serving the one or more geographic regions;

receiving, at the point of presence and based on the unique anycast prefix, content requests that originate within the one or more geographic regions;

determining a reason to route additional content requests originating in at least one of the one or more geographic regions to another point of presence associated with the content delivery network; and based on the determination, switching, by the point of presence, the announcement of the unique anycast prefix for the at least one geographic region to an announcement of another unique anycast prefix that identifies the other point of presence associated with the content delivery network, thereby causing the additional content requests originating in the at least one of the one or more geographic regions to be routed to the other point of presence instead of the point of presence.

2. The system of claim 1, wherein the reason comprises one or more overloaded servers or a potential for one or more overloaded servers.

3. The system of claim 1, wherein:
the unique anycast prefix includes a first set of Internet Protocol (IP) addresses;
the other unique anycast prefix includes a second set of IP addresses that is different than the first set of IP addresses; and
the common anycast prefix includes a third set of IP addresses that covers both the first set of IP addresses and the second set of IP addresses.

4. The system of claim 1, wherein the switch is implemented at a predetermined time of day.

5. The system of claim 1, wherein the reason comprises a performance level for routing the content requests to the point of presence being below a threshold performance level based on an analysis of measurable factors including latency and bandwidth.

6. The system of claim 1, wherein the networks include at least one of an Internet Service Provider network, a cellular carrier network, or an enterprise network.

7. The system of claim 4, wherein the operations further comprise:
identifying traffic patterns that cause performance issues for the point of presence; and
learning the predetermined time of day based on the traffic patterns.

8. A method comprising:
announcing, by a point of presence associated with a content delivery network, a common anycast prefix, wherein the point of presence announces the common anycast prefix to networks serving one or more geographic regions;
announcing, by the point of presence and simultaneously with the announcement of the common anycast prefix, a unique anycast prefix to the networks serving the one or more geographic regions;
receiving, at the point of presence and based on the unique anycast prefix, content requests that originate within the one or more geographic regions;
determining a reason to route additional content requests originating in at least one of the one or more geographic regions to another point of presence associated with the content delivery network; and
based on the determination, switching, by the point of presence, the announcement of the unique anycast prefix for the at least one geographic region to an announcement of another unique anycast prefix that identifies the other point of presence associated with the content delivery network, thereby causing the additional content requests originating in the at least one of the one or more geographic regions to be routed to the other point of presence instead of the point of presence.

9. The method of claim 8, wherein the reason comprises one or more overloaded servers or a potential for one or more overloaded servers.

10. The method of claim 8, wherein:
the unique anycast prefix includes a first set of Internet Protocol (IP) addresses;
the other unique anycast prefix includes a second set of IP addresses that is different than the first set of IP addresses; and
the common anycast prefix includes a third set of IP addresses that covers both the first set of IP addresses and the second set of IP addresses.

11. The method of claim 8, wherein the switch is implemented at a predetermined time of day.

12. The method of claim 11, further comprising:
identifying traffic patterns that cause performance issues for the point of presence; and
learning the predetermined time of day based on the traffic patterns.

13. The method of claim 8, wherein the reason comprises a performance level for routing the content requests to the point of presence being below a threshold performance level based on an analysis of measurable factors including latency and bandwidth.

14. The method of claim 8, wherein the networks include at least one of an Internet Service Provider network, a cellular carrier network, or an enterprise network.

15. A computer-readable storage medium having computer-executable instructions stored thereupon which, when executed by one or more processors, cause a system to perform operations comprising:
announcing, by a point of presence associated with a content delivery network, a common anycast prefix, wherein the point of presence announces the common anycast prefix to networks serving one or more geographic regions;
announcing, by the point of presence and simultaneously with the announcement of the common anycast prefix, a unique anycast prefix to the networks serving the one or more geographic regions;
receiving, at the point of presence and based on the unique anycast prefix, content requests that originate within the one or more geographic regions;
determining a reason to route additional content requests originating in at least one of the one or more geographic regions to another point of presence associated with the content delivery network; and
based on the determination, switching, by the point of presence, the announcement of the unique anycast prefix for the at least one geographic region to an announcement of another unique anycast prefix that identifies the other point of presence associated with the content delivery network, thereby causing the additional content requests originating in the at least one of the one or more geographic regions to be routed to the other point of presence instead of the point of presence.

16. The computer-readable storage medium of claim 15, wherein the reason comprises one or more overloaded servers or a potential for one or more overloaded servers.

17. The computer-readable storage medium of claim 15, wherein:
the unique anycast prefix includes a first set of Internet Protocol (IP) addresses;

the other unique anycast prefix includes a second set of IP addresses that is different than the first set of IP addresses; and the common anycast prefix includes a third set of IP addresses that covers both the first set of IP addresses and the second set of IP addresses.

18. The computer-readable storage medium of claim 15, wherein the switch is implemented at a predetermined time of day.

19. The computer-readable storage medium of claim 18, wherein the operations further comprise:

identifying traffic patterns that cause performance issues for the point of presence; and learning the predetermined time of day based on the traffic patterns.

20. The computer-readable storage medium of claim 15, wherein the reason comprises a performance level for routing the content requests to the point of presence being below a threshold performance level based on an analysis of measurable factors including latency and bandwidth.

\* \* \* \* \*